(12) United States Patent
Ting et al.

(10) Patent No.: US 7,486,655 B2
(45) Date of Patent: Feb. 3, 2009

(54) MIMO-OFDM SYSTEM AND PRE-CODING AND FEEDBACK METHOD THEREIN

(75) Inventors: Pang-An Ting, Fongyuan (TW); Chao-Kai Wen, Taipei (TW); Wei-Ping Chuang, Kaohsiung (TW); Jiunn-Tsair Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 631 days.

(21) Appl. No.: 11/327,217

(22) Filed: Jan. 5, 2006

(65) Prior Publication Data

US 2007/0115799 A1 May 24, 2007

(30) Foreign Application Priority Data

Oct. 18, 2005 (TW) ............................. 94136284 A

(51) Int. Cl.
*H04J 1/00* (2006.01)

(52) U.S. Cl. .................. 370/343; 370/329; 370/295; 375/347

(58) Field of Classification Search .......... 370/208, 370/478, 329, 343
See application file for complete search history.

(56) References Cited

U.S. PATENT DOCUMENTS

| 5,475,793 | A * | 12/1995 | Broomhead et al. ............ 706/14 |
| 6,956,907 | B2 * | 10/2005 | Ketchum .................... 375/267 |
| 7,158,563 | B2 * | 1/2007 | Ginis et al. ................. 375/224 |
| 7,218,906 | B2 * | 5/2007 | Sayeed et al. ............... 455/295 |
| 7,356,017 | B2 * | 4/2008 | Codreanu et al. ............ 370/343 |
| 7,424,063 | B2 * | 9/2008 | Yee .......................... 375/267 |
| 2004/0181419 | A1 * | 9/2004 | Davis et al. ................... 705/1 |
| 2005/0152484 | A1 * | 7/2005 | Sandhu et al. ............... 375/347 |
| 2005/0237971 | A1 * | 10/2005 | Skraparlis ................... 370/329 |
| 2006/0056531 | A1 * | 3/2006 | Li et al. ...................... 375/267 |
| 2006/0285531 | A1 * | 12/2006 | Howard et al. .............. 370/343 |

OTHER PUBLICATIONS

"Channel Models for Fixed Wireless Applications" IEEE 802.16 Broadband Wireless Access Working Group < http://ieee802.org/16 > / Chair, IEEE 802.16 Working Group on Broadband Wireless Access Standards National Institute of Standards and Technology, U.S. Department of Commerce Boulder, CO, USA / Jul. 16, 2001, pp. 1-36.

(Continued)

*Primary Examiner*—Ricky Ngo
*Assistant Examiner*—Dewanda Samuel
(74) *Attorney, Agent, or Firm*—J.C. Patents

(57) ABSTRACT

The present invention provides an antenna-array-based multiple-input multiple-output orthogonal-frequency-division-multiplexing (MIMO-OFDM) system and a pre-coding and feedback method used in the same. The present invention uses QR decompositions of the MIMO channel matrixes to parameterize the channel state information (CSI) of every OFDM frequency band. In addition, the present invention feeds back the information related to $\theta$ and $\phi$ in the Givens rotation matrixes of the partial frequency bands and then uses an interpolation method to generate $\theta$ and $\phi$ in the Givens rotation matrixes of all the frequency bands, which further is able to represent the CSI of all the frequency bands. In this way, the present invention has advantages of low complexity and low feedback rate requirement.

17 Claims, 6 Drawing Sheets

OTHER PUBLICATIONS

"Closed Loop IMO Pre-Coding using Givens Rotation" IEEE 802.16 Broadband Wireless Access Working Group < http://ieee802.org/16 > / Chair, IEEE 802.16 Working Group on Broadband Wireless Access Standards National Institute of Standards and Technology, U.S. Department of Commerce Boulder, CO, USA / Jan. 24, 2005, pp. 1-12.

"Capacity of Multi-antenna Gaussian Channels" I. Emre Telatar, Technical Memorandum, Bell Laboratories, Lucent Technologies, Oct. 1995. Published in *European Transactions on Telecommunications*, vol. 10, No. 6, pp. 585-595, Nov./Dec. 1999.

"On Limits of Wireless Communications in a Fading Environment when Using Multiple Antennas" G.J. Foschini et al., Wireless Personal Communications 6, pp. 311-335, 1998 Kluwer Academic Publishers.

"On Beamforming With Finite Rate Feedback in Multiple-Antenna Systems" Krishna kiran et al., IEEE Transactions on Information Theory, vol. 49, No. 10, Oct. 2003, pp. 2562-2579.

"Grassmannian Beamforming for Multiple-Input Multiple-Output Wireless Systems" David J. Love and Robert W. Heath, IEEE Trans. Inf. Theory, vol. 49, No. 10, pp. 2735-2745, Oct. 2003.

"Performance of Linear Interpolation-Based MIMO Detection for MIMO-OFDM Systems" Jingming Want et al., WCNC 2004, IEEE Communication Society, pp. 981-986.

"On the Design of MIMO Block-Fading Channels With Feedback-Link Capacity Constraint" Vincent Lau et al., IEEE Transactions on Communication, vol. 52, No. 1, Jan. 2004, pp. 62-70.

"An Efficient Feedback Method for MIMO Systems with Slowly Time-Varying Channels" June Chul Roh et al., WCNC 2004, IEEE Communications Society, pp. 760-764.

"On the Capacity of OFDM-Based Spatial Multiplexing Systems" Helmut Bolcskei et al., IEEE Transactions on Communications, vol. 50, No. 2, Feb. 2002, pp. 225-234.

"Interpolation Based Unitary Precoding for Spatial Multiplexing MIMO-OFDM with Limited Feedback" Jihoon Choi and Robert W. Heath, Jr. / IEEE Communications Society, Globecom 2004, pp. 214-218.

"Part 16: Air Interface for Fixed and Mobile Broadband Wireless Access Systems—Amendment for Physical and Medium Access Control Layers for Combined Fixed and Mobile Operation in Licensed Bands" IEEE 802.16 Broadband Wireless Access Working Group < http://ieee802.org/16 > / Chair, IEEE 802.16 Working Group on Broadband Wireless Access Standards National Institute of Standards and Technology, U.S. Department of Commerce Boulder, CO, USA, Dec. 23, 2004, pp. 1-12.

* cited by examiner ized as the transmit/receive weighting vectors, and a water-filing power allocation is used to establish the optimum spatial multiplexing system.

MIMO-OFDM SYSTEM AND PRE-CODING AND FEEDBACK METHOD THEREIN

CROSS-REFERENCE TO RELATED APPLICATION

This application claims the priority benefit of Taiwan application serial no. 94136284, filed on Oct. 18, 2005. All disclosure of the Taiwan application is incorporated herein by reference.

BACKGROUND OF THE INVENTION

1. Field of Invention

The present invention relates to an orthogonal-frequency-division-multiplexing wireless system (OFDM wireless system), and particularly to an antenna-array-based multiple-input multiple-output orthogonal-frequency-division-multiplexing (MIMO-OFDM) system. The MIMO-OFDM system uses QR decomposition of the MIMO channel matrix to parameterize the channel state information (CSI).

2. Description of the Related Art

The wireless mobile communication today is capable of carrying mega transmission data and this has become a standard requirement in the modern society. To more effectively increase the channel capacity thereof, today's wireless mobile communication employs a so-called antenna-array-based MIMO-OFDM technology. In a MIMO-OFDM system with a closed loop, a spatial vector-coding scheme is used at the transmitter thereof, which can largely increase the channel capacity. However, the effectiveness of the spatial vector-coding scheme depends on the correctness of the estimated MIMO channel state information (CSI) at the receiver of the system. Therefore, the parameters and information fed back from the receiver to the transmitter must be sufficient for the transmitter to reproduce the CSI, even more so when the number of the transmitting antenna is larger than the number of the receiving antenna.

Among the currently available spatial vector-coding schemes, a preferred solution provides the maximum mutual information of the MIMO channels by means of singular value decomposition (SVD) of the MIMO channel matrix H for each frequency band to parameterize the CSI. The SVD can be expressed by:

$$H \xrightarrow{SVD} U\Sigma V^*,$$

And, by implementing a Givens rotation on the V matrixes of all the frequency bands for producing, a plurality of Givens rotation matrixes $G_{p,q}(\theta,\phi)$ can be generated. Such transformation can be expressed by:

$$V \xrightarrow{GivensRotations} G_1 G_2 \ldots G_{\frac{(2M_T-1)M_R-M_R^2}{2}}.$$

Afterwards, the Givens rotation matrix information of all the frequency bands are fed back to the transmitter, where the Givens rotation matrixes are combined for re-obtaining the V matrixes of all the frequency bands. Then, the V matrixes of all the frequency bands are applied to the vector coding at the transmitter. In the above-described solution scheme, the right/left singular vectors of the MIMO channel matrixes are Obviously, the above-described scheme has the such disadvantages as too much computation, high complexity and excessive feedback data or feedback rate. It is because the receiver needs to conduct computations to obtain the V matrixes from the MIMO channel matrixes H and then to conduct computations to obtain the Givens rotation matrixes from the V matrixes for each frequency band, so that the computation and high complexity are inevitable. In addition, the Givens rotation matrix information of all the frequency bands is required to be fed back, therefore the feedback information is proportional to the number of frequency bands. For 512 frequency bands, a typical number of frequency bands, the disadvantage of excessive feedback data or feedback rate is also inevitable. For example, if the channel matrix H has a dimension of 2×4, 62 complex numbers are needed to conduct a multiplication for each frequency band and at least 10 real numbers are required to be fed back, then the total feedback information reaches as high as 5,120 real numbers.

SUMMARY OF THE INVENTION

The present invention provides an antenna-array-based multiple-input multiple-output orthogonal-frequency-division-multiplexing (MIMO-OFDM) system. The MIMO-OFDM system can avoid excessive computation, high complexity and excessive feedback data or feedback rate in the prior art.

The present invention provides a feedback method in the antenna-array-based MIMO-OFDM system. The method is capable of reducing the complexity, lowering the computation, freely controlling the feedback data amount and responding to the feedback rate requirement.

The present invention provides a pre-coding method in the antenna-array-based MIMO-OFDM system. The method is able to approach an ideal channel capacity and an acceptable mutual information loss while reducing the feedback data.

The present invention provides an antenna-array-based MIMO-OFDM system. The receiver of the system includes $M_R$ receiving antennas, $M_R$ frequency band demodulators, a channel estimator & feedback parameter generator and N detectors. The transmitter of the system includes a vector-coding matrix generator, N coders, $M_T$ frequency band modulators and $M_T$ transmitting antennas. Wherein, $M_R$, $M_T$, N and n are natural numbers and $0 < n \leq N$.

In the receiver provided by the present invention, the above-described $M_R$ frequency band demodulators are coupled to the $M_R$ receiving antennas. The frequency band demodulators demodulate the signals received by the receiving antennas, thus each frequency band demodulator obtains N tones of N different frequency bands. The above-described channel estimator & feedback parameter generator is coupled to the frequency band demodulators and according to the outputs from the frequency band demodulators, estimates the obtained channel state information (CSI) of the N different frequency bands. Further, the channel estimator & feedback parameter generator produces feedback parameters according to the CSI and feeds back the feedback parameters to the transmitter. The above-described N detectors are coupled to the frequency band demodulators and the channel estimator & feedback parameter generator, and according to the CSI, decode the outputs from the frequency band demodulators to obtain N receiving data vectors, wherein each single detector receives the tones with a same frequency band output from all the frequency band demodulators.

In the transmitter of the system provided by the present invention, the above-described vector-coding matrix generator, according to the feedback parameters, produces N spatial vector-coding matrixes W(n). That is, H(n) is a MIMO channel matrix of the n-th frequency band, and the QR decomposition of H(n) can be expressed by:

$$H(n)=R(n)Q^*(n),$$

wherein R(n) is a lower triangular matrix with a dimension of $M_R \times M_T$, Q(n) is an orthonormal matrix with a dimension of $M_T \times M_T$ and $Q^*(n)$ represents the complex conjugate transpose matrix of Q(n). When $Q(n)=[q_1(n)\ q_2(n)\ \ldots\ q_{MT}(n)]$, $q_m(n)$ represents the m-th column vector in the matrix Q(n), thus:

$$W(n)=[q_1(n)q_2(n)\ldots q_M(n)],$$

wherein M and m are natural numbers and $0<M\leq M_T$. The above-described N coders are coupled to the vector-coding matrix generator and receive N transmission data vectors. Each transmission data vector has a dimension of M×1. According to the vector-coding matrixes, the coders conduct coding on the transmission data vectors and each coder outputs $M_T$ tones with a same frequency band but different from the other coders. The above-described $M_T$ frequency band modulators are coupled to the coders and the transmitting antennas and conduct modulating on the outputs from the coders, then output the modulated signals at the transmitting antennas, wherein each frequency band modulator receives the tones of N different frequency bands output from all the coders.

According to the MIMO-OFDM system described in the embodiment of the present invention, the above-described channel estimator & feedback parameter generator, according to the CSI, implements Givens rotations on the MIMO channel matrixes H(n) to generate a plurality of Givens rotation matrixes $G_{p,q}(\theta,\phi)$ and produces feedback parameters according to the θ and φ of the Givens rotation matrixes. In the embodiment, the channel estimator & feedback parameter generator according to the Givens rotation matrixes $G_{p,q}(\theta,\phi)$, uses a preferred method, i.e., a delta modulation on θ and φ, to produce the feedback parameters. In particular, the channel estimator & feedback parameter generator uses a delta modulation with a one-bit quantizer or a multi-bit quantizer on θ and φ to produce the feedback parameters.

According to the MIMO-OFDM system described in the embodiment of the present invention, the channel estimator & feedback parameter generator at the receiver, according to the MIMO channel matrixes of a part of frequency bands, only produces the Givens rotation matrixes $G_{p,q}(\theta,\phi)$ of the part of frequency bands. The channel estimator & feedback parameter generator, according to θ and φ of the Givens rotation matrixes of the part of frequency bands, further produces the feedback parameters. That is, only the information of a part of the frequency bands is contained in the produced feedback parameters. The vector-coding matrix generator at the transmitter, according to the produced feedback parameters, would generate θ(n),φ(n) of the part of the frequency bands. Afterwards, an interpolation method is used to generate θ(n), φ(n) of all the frequency bands, and further to generate all spatial vector-coding matrixes.

The MIMO-OFDM system provided by the present invention is applicable to a system with a receiving antenna number smaller than the transmitting antenna number; that is, $M_R<M_T$. In particular, when $M_R<<M_T$, the effect of the present invention can be best proven.

The present invention provides a feedback method in the MIMO-OFDM system, wherein the system includes $M_R$ receiving antennas and $M_T$ transmitting antennas. The feedback method includes the following steps. First, the signals received by the $M_R$ receiving antennas are demodulated, where the signals received by each receiving antenna can be demodulated to obtain tones of N different frequency bands. Next, according to the tones of all the different frequency bands, the obtained channel state information (CSI) of N different frequency bands is estimated. Afterwards, all the tones are divided into N sets and each set sequentially includes $M_R$ tones with a same frequency band obtained by different receiving antennas. According to the CSI, the tones of every set are detected and decoded, thus N receiving data vectors are obtained. Meanwhile, according to the CSI, the feedback parameters are produced and output to the transmitter, wherein H(n) is the MIMO channel matrix of the n-th frequency band and the QR decomposition of H(n) is expressed by:

$$H(n)=R(n)Q^*(n),$$

wherein R(n) represents a lower triangular matrix with a dimension of $M_R \times M_T$, Q(n) represents an orthonormal matrix with a dimension of $M_T \times M_T$ and $Q^*(n)$ represents the complex conjugate transpose matrix of Q(n). When $Q(n)=[q_1(n)\ q_2(n)\ldots q_{MT}(n)]$, $q_m(n)$ represents the m-th column vector in the matrix Q(n), and when the spatial vector-coding matrix $W(n)=[q_1(n)\ q_2(n)\ \ldots\ q_M(n)]$, the tone of every same frequency band detected and decoded to obtain all the receiving data vectors corresponds to coding the tones by using the spatial vector-coding matrixes W(n). The above-described $M_T$, N, M, m and n are natural numbers and $0<M\leq M_T$, $0<n\leq N$.

According to the feedback method in the MIMO-OFDM system described in the embodiment of the present invention, the Givens rotations are used on the MIMO channel matrix to generate a plurality of Givens rotation matrixes $G_{p,q}(\theta,\phi)$, and the feedback parameters are produced according to the θ and φ of the Givens rotation matrixes. In the present embodiment, a delta modulation is, as the preferred method, conducted on θ and φ in the Givens rotation matrixes $G_{p,q}(\theta,\phi)$ to produce feedback parameters. In particular, a delta modulation with a one-bit quantizer or a multi-bit quantizer is conducted on θ and φ to produce feedback parameters.

According to the feedback method in the MIMO-OFDM system described in the embodiment of the present invention, according to the MIMO channel matrixes of a part of frequency bands, only the Givens rotation matrixes $G_{p,q}(\theta,\phi)$ of the part of frequency bands are generated. Further, according to θ and φ of the Givens rotation matrixes of the part of frequency bands, the feedback parameters are produced.

The present invention provides a pre-coding method in the MIMO-OFDM system, wherein the system includes $M_R$ receiving antennas and $M_T$ transmitting antennas. The pre-coding method includes the following steps. First, the feedback parameters output from the receiver are received. Next, according to the received feedback parameters, N spatial vector-coding matrixes W(n) are produced. In more detail, when H(n) is a MIMO channel matrix of the n-th frequency band, the QR decomposition of H(n) can be expressed by:

$$H(n)=R(n)Q^*(n),$$

wherein R(n) is a lower triangular matrix with a dimension of $M_R \times M_T$, Q(n) is an orthonormal matrix with a dimension of $M_T \times M_T$ and $Q^*(n)$ represents the complex conjugate transpose matrix of $Q(n)$. When $Q(n)=[q_1(n)\ q_2(n)\ \ldots\ q_{MT}(n)]$, $q_m(n)$ represents the m-th column vector in the matrix $Q(n)$, thus $W(n)=[q_1(n)\ q_2(n)\ \ldots\ q_M(n)]$. Afterwards, N transmission data vectors are received, wherein each transmission data vector has a dimension of M×1. According to the vector-coding matrixes, the transmission data vectors are coded and each transmission data vector is coded to obtain $M_T$ tones with a same frequency band, wherein the tones obtained from different transmission data vector have different frequency bands from each other. Further, all the tones are divided into $M_T$ sets and each set sequentially includes N tones with different frequency bands obtained from the different transmission data vectors. After conducting modulations on the tones of each set, the modulated signals are output by the transmitting antennas. The above-described $M_R$, $M_T$, M, N, m and n are natural numbers and $0 < M \leq M_T$, $0 < n \leq N$.

According to the pre-coding method in the MIMO-OFDM system described in the embodiment of the present invention, a plurality of Givens rotation matrixes $G_{p,q}(\theta,\phi)$ are generated according to the feedback parameters and then N spatial vector-coding matrixes $W(n)$ are produced according to the Givens rotation matrixes $G_{p,q}(\theta,\phi)$. In the present embodiment, a delta modulation is, as the preferred method, conducted on $\theta$ and $\phi$ in the Givens rotation matrixes $G_{p,q}(\theta,\phi)$ to produce feedback parameters. In particular, a delta modulation with a one-bit quantizer or a multi-bit quantizer is conducted on $\theta$ and $\phi$ to produce feedback parameters.

According to the pre-coding method in the MIMO-OFDM system described in the embodiment of the present invention, $\theta(n)$ and $\phi(n)$ of only partial frequency bands are generated according to the feedback parameters, then an interpolation method is used to generate $\theta(n)$ and $\phi(n)$ of all the frequency bands and further the spatial vector-coding matrixes are produced.

The present invention uses a QR decomposition of the MIMO channel matrixes to parameterize the channel state information (CSI), instead of using a complicate singular value decomposition (SVD) to parameterize the CSI, therefore the complexity is reduced and the computation is reduced. In addition, in the present invention, only $\theta$ and $\phi$ in the Givens rotation matrixes of a part of frequency bands are fed back and an interpolation method is used to generate $\theta$ and $\phi$ in the Givens rotation matrixes of all the frequency bands and to further produce the spatial vector-coding matrixes of all the frequency bands, therefore the feedback data amount can be freely controlled and the feedback rate requirement can be well responded to.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The related prior art is characterized in that a singular value decomposition (SVD) of the MIMO channel matrix of each frequency band is used to parameterize the channel state information (CSI); further a plurality of Givens rotation matrixes $G_{p,q}(\theta,\phi)$ are generated by using the Givens rotation on the V matrixes of all the frequency bands; furthermore. the information of the Givens rotation matrixes of all the frequency bands is fed back to the transmitter and is combined (re-produced) at the transmitter to re-obtain the V matrixes of all the frequency bands; finally, the re-obtained V matrixes are used in the vector coding at the transmitter. However, it is questionable whether or not the SVD is the only approach to provide the solution. Is there a simpler computation approach? Is the information of all the frequency bands required to be fed back. Accordingly, the present invention provides a solution characterized in that QR decompositions of the MIMO channel matrixes are used to parameterize the CSI. Hence, the Givens rotation can be directly applied to the MIMO channel matrixes for generating the Givens rotation matrixes $G_{p,q}(\theta,\phi)$. Another major feature of the present invention is that only $\theta$ and $\phi$ of the Givens rotation matrixes of partial frequency bands are fed back and an interpolation method is used to generate $\theta$ and $\phi$ of the Givens rotation matrixes of all the frequency bands and to further produce spatial vector-coding matrixes of all the frequency bands.

Figure 1:
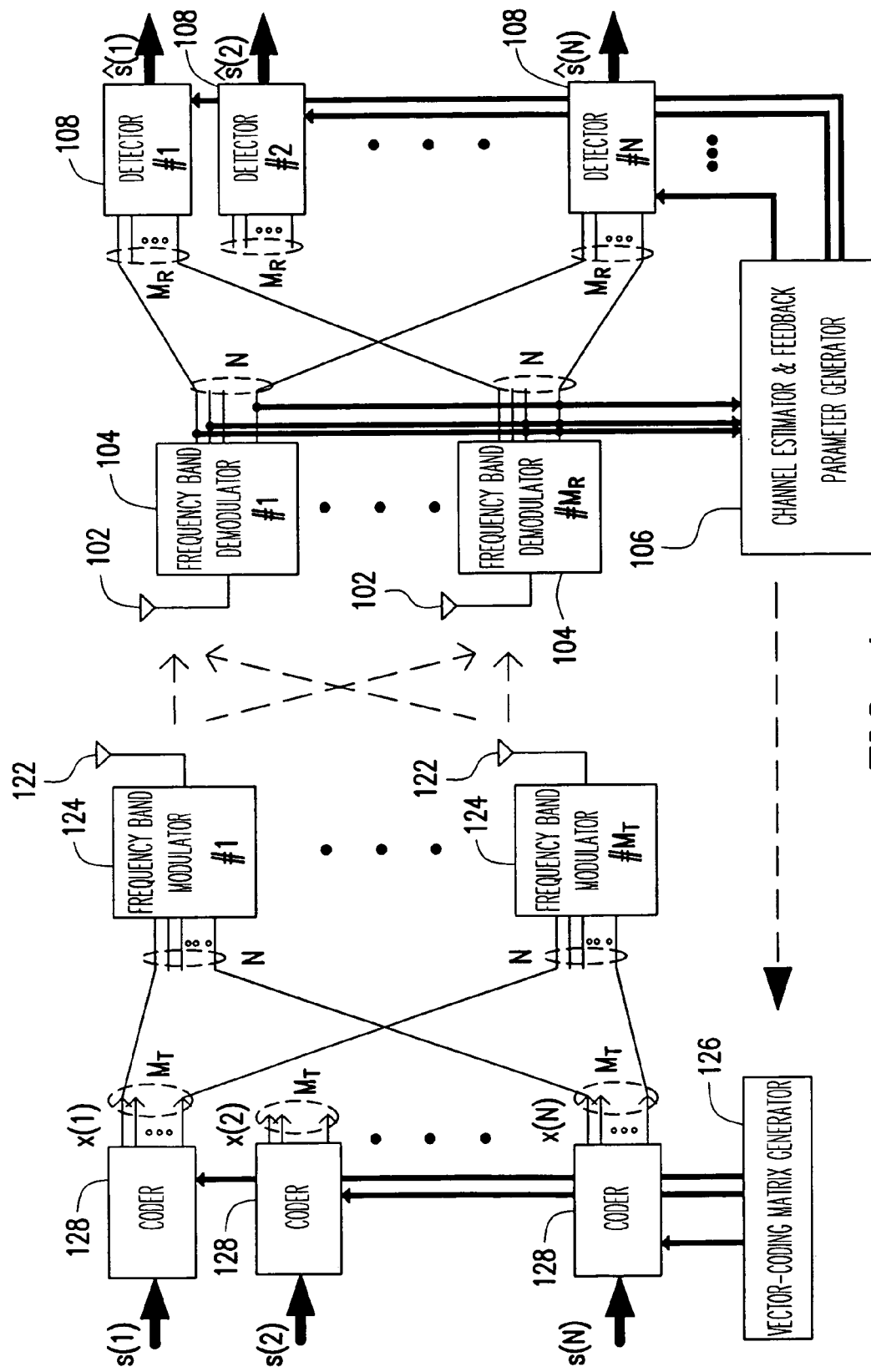
FIG. 1 is a block diagram showing a MIMO-OFDM system having the spatial vector-coding scheme in an embodiment of the present invention.

FIG. 1 is a block diagram showing a MIMO-OFDM system having the spatial vector-coding scheme in an embodiment of the present invention. Referring to FIG. 1, the system comprises a transmitter and a receiver and has N different frequency bands. The transmitter of the system includes $M_T$ transmitting antennas 122, $M_T$ frequency band modulators 124, a vector-coding matrix generator 126 and N coders 128. The receiver of the system includes $M_R$ receiving antennas, $M_R$ frequency band demodulators 104, a channel estimator & feedback parameter generator 106 and N detectors 108. Wherein, $M_R$. $M_T$ and N are natural numbers.

In the transmitter of the system provided by the present invention, the N coders 128 receive N transmission data vectors $s(n)$, each coder 128 corresponds to a different frequency band and each transmission data vector has a dimension of M×1. The coders 128 conduct spatial vector-coding on the transmission data vectors $s(n)$ according to the channel state information (CSI) of each different frequency band. That is, the coders 128 conduct coding on the N transmission data vectors $s(n)$ according to N vector-coding matrixes $W(n)$. Since each different frequency band has a different vector-coding matrix $W(n)$ with a dimension of $M_T \times M$, each coder 128 outputs $M_T$ tones with a same frequency band but different from the other coders, wherein M and n are natural numbers and $0<M \leqq M_T$, $0<n \leqq N$. Referring to FIG. 1, the $M_T$ frequency band modulators 124 are coupled to the coders 128 and the $M_T$ transmitting antennas 122. Each frequency band modulator 124 sequentially receives the tones with different frequency bands output from all the coders 128 and conducts modulations on the tones with different frequency bands output from all the coders 128, then the modulated tones are transmitted as wireless signals through the transmitting antennas 122. In particular, the modulation conducted by the frequency band modulator 124 is an inverse fast Fourier transform (IFFT).

In the receiver provided by the present invention, $M_R$ frequency band demodulators 104 are coupled to the $M_R$ receiving antennas. The frequency band demodulators 104 demodulate the radio signals received by the receiving antennas 102, thus each frequency band demodulator 104 obtains N tones of N different frequency bands. In particular, the demodulation conducted by the frequency band demodulators 104 is a fast Fourier transform (FFT). The channel estimator & feedback parameter generator 106 is coupled to the frequency band demodulators 104 and according to the outputs from the frequency band demodulators 104, estimates the obtained channel state information (CSI) of the N different frequency bands. The N detectors 108 are coupled to the frequency band demodulators 104 and the channel estimator & feedback parameter generator 106. Each detector 108 corresponds to a different frequency band. A single detector 108 receives the tones with a same frequency band output from all the frequency band demodulators 104 and according to the CSI of the different frequency bands, conducts decoding on the outputs from the frequency band demodulators 104 to obtain N receiving data vectors $\hat{s}(n)$.

From the above described it can be seen that either the transmitter or the receiver uses the CSI of every different frequency band to conduct coding and decoding. One major feature of the present invention is that QR decompositions of the MIMO channel matrixes are used to parameterize the CSI. Hence, the channel estimator & feedback parameter generator 106 estimates the obtained CSI of N different frequency bands according to the outputs from all the frequency band demodulators 104 and according to the CSI produces the feedback parameters related to the QR decompositions of the MIMO channel matrixes, followed by feeding back the produced feedback parameters to the transmitter. The vector-coding matrix generator 126, according to the feedback parameters sent from the receiver, produces the CSI of all the different frequency bands, i.e. the above-described N spatial vector-coding matrixes W(n). When H(n) is a MIMO channel matrix of the n-th frequency band, the QR decomposition of H(n) can be expressed by:

$$H(n)=R(n)Q^*(n),$$

wherein R(n) is a lower triangular matrix with a dimension of $M_R \times M_T$, Q(n) is an orthonormal matrix with a dimension of $M_T \times M_T$ and $Q^*(n)$ represents the complex conjugate transpose matrix of Q(n). When $Q(n)=[q_1(n)\ q_2(n)\ \ldots\ q_{MT}(n)]$, $q_m(n)$ represents the m-th column vector in the matrix Q(n), thus:

$$W(n)=[q_1(n)q_2(n)\ldots q_M(n)],$$

wherein M and m are natural numbers and $0<M \leqq M_T$.

As a matter of facts, the channel estimator & feedback parameter generator 106 is not required to really produce Q(n); instead, according to the CSI of the different frequency bands and directly applying the Givens rotation on the MIMO channel matrixes H(n), the generator 106 generates a plurality of Givens rotation matrixes $G_{p,q}(\theta,\phi)$. Afterwards, according to $\theta$ and $\phi$ of the Givens rotation matrixes, the generator 106 produces the feedback parameters. Further, the vector-coding matrix generator 126 would directly combine (re-produce) the feedback parameters related to $\theta$ and $\phi$ of the Givens rotation matrixes and obtain Q(n). Furthermore, the vector-coding matrix generator 126 would produce the above-described N the spatial vector-coding matrixes W(n) according to a plurality of column vectors in the matrixes Q(n).

In the present embodiment, the channel estimator & feedback parameter generator 106 according to the Givens rotation matrixes $G_{p,q}(\theta,\phi)$ uses a delta modulation on $\theta$ and $\phi$ to produce the feedback parameters. In particular, the channel estimator & feedback parameter generator 106 uses a delta modulation with a one-bit quantizer or a multi-bit quantizer on $\theta$ and $\phi$ to produce the feedback parameters.

According to the above-described operations at the receiver of the system, a feedback method in the MIMO-OFDM system provided by the present invention can be summarized into the following steps. First, the signals received by the $M_R$ receiving antennas are demodulated, wherein the signals received by each receiving antenna can be demodulated to obtain tones of N different frequency bands. Next, according to the tones of all the different frequency bands, the obtained channel state information (CSI) of N different frequency bands is estimated. Afterwards, all the tones are divided into N sets and each set sequentially includes $M_R$ tones with a same frequency band but obtained by different receiving antennas. According to the CSI, the tones of every set are detected and decoded, thus N receiving data vectors are obtained. Meanwhile, according to the CSI, the feedback parameters are produced and output to the transmitter, wherein when H(n) is the MIMO channel matrix of the n-th frequency band, the QR decomposition of H(n) is expressed by:

$$H(n)=R(n)Q^*(n),$$

wherein R(n) represents a lower triangular matrix with a dimension of $M_R \times M_T$, Q(n) represents an orthonormal matrix with a dimension of $M_T \times M_T$ and $Q^*(n)$ represents the complex conjugate transpose matrix of Q(n). When $Q(n)=[q_1(n)\ q_2(n)\ \ldots\ q_{MT}(n)]$, $q_m(n)$ represents the m-th column vector in the matrix Q(n), and when the spatial vector-coding matrix $W(n)=[q_1(n)\ q_2(n)\ \ldots\ q_M(n)]$, the tone of every same frequency band detected and decoded to obtain all the receiving data vectors corresponds to coding the tones by using the spatial vector-coding matrixes W(n). The above-described $M_R$, $M_T$, N, M, m and n are natural numbers and $0<M \leqq M_T$, $0<n \leqq N$.

In the feedback method, the Givens rotations are directly used on the MIMO channel matrix H(n) to generate a plurality of Givens rotation matrixes $G_{p,q}(\theta,\phi)$, and the feedback parameters are produced according to the $\theta$ and $\phi$ of the Givens rotation matrixes. A delta modulation is, as the preferred method, conducted on $\theta$ and $\phi$ in the Givens rotation matrixes $G_{p,q}(\theta,\phi)$ to produce feedback parameters. In particular, a delta modulation with a one-bit quantizer or a multi-bit quantizer is conducted on $\theta$ and $\phi$ to produce feedback parameters.

Similarly, the above-described operations at the transmitter of the system a pre-coding method in the MIMO-OFDM system provided by the present invention can be summarized into the following steps. First, the feedback parameters output from the receiver are received. Next, according to the received feedback parameters, N spatial vector-coding matrixes W(n)

are produced. In more detail, when H(n) is a MIMO channel matrix of the n-th frequency band, the QR decomposition of H(n) can be expressed by:

$$H(n)=R(n)Q^*(n),$$

wherein R(n) is a lower triangular matrix with a dimension of $M_R \times M_T$, Q(n) is an orthonormal matrix with a dimension of $M_T \times M_T$ and $Q^*(n)$ represents the complex conjugate transpose matrix of Q(n). When $Q(n)=[q_1(n)\ q_2(n) \ldots q_{MT}(n)]$, $q_m(n)$ represents the m-th column vector in the matrix Q(n), thus $W(n)=[q_1(n)\ q_2(n) \ldots q_M(n)]$. Afterwards, N transmission data vectors are received, wherein each transmission data vector has a dimension of M×1. According to the vector-coding matrixes, the transmission data vectors are coded and after the coding each transmission data vector, the $M_T$ tones with a same frequency band are obtained, wherein the tones obtained from different transmission data vector have different frequency bands from each other. Further, all the tones are divided into $M_T$ sets and each set sequentially includes N tones with different frequency bands obtained from the different transmission data vectors. After conducting modulations on the tones of each set, the modulated signals are transmitted by the transmitting antennas. The above-described $M_T$, $M_R$, M, N, m and n are natural numbers and $0<M \leq M_T$, $0<n \leq N$.

In the pre-coding method, a plurality of Givens rotation matrixes $G_{p,q}(\theta,\phi)$ are generated according to the feedback parameters and then N spatial vector-coding matrixes W(n) are produced according to the Givens rotation matrixes $G_{p,q}(\theta,\phi)$.

Figure 2:
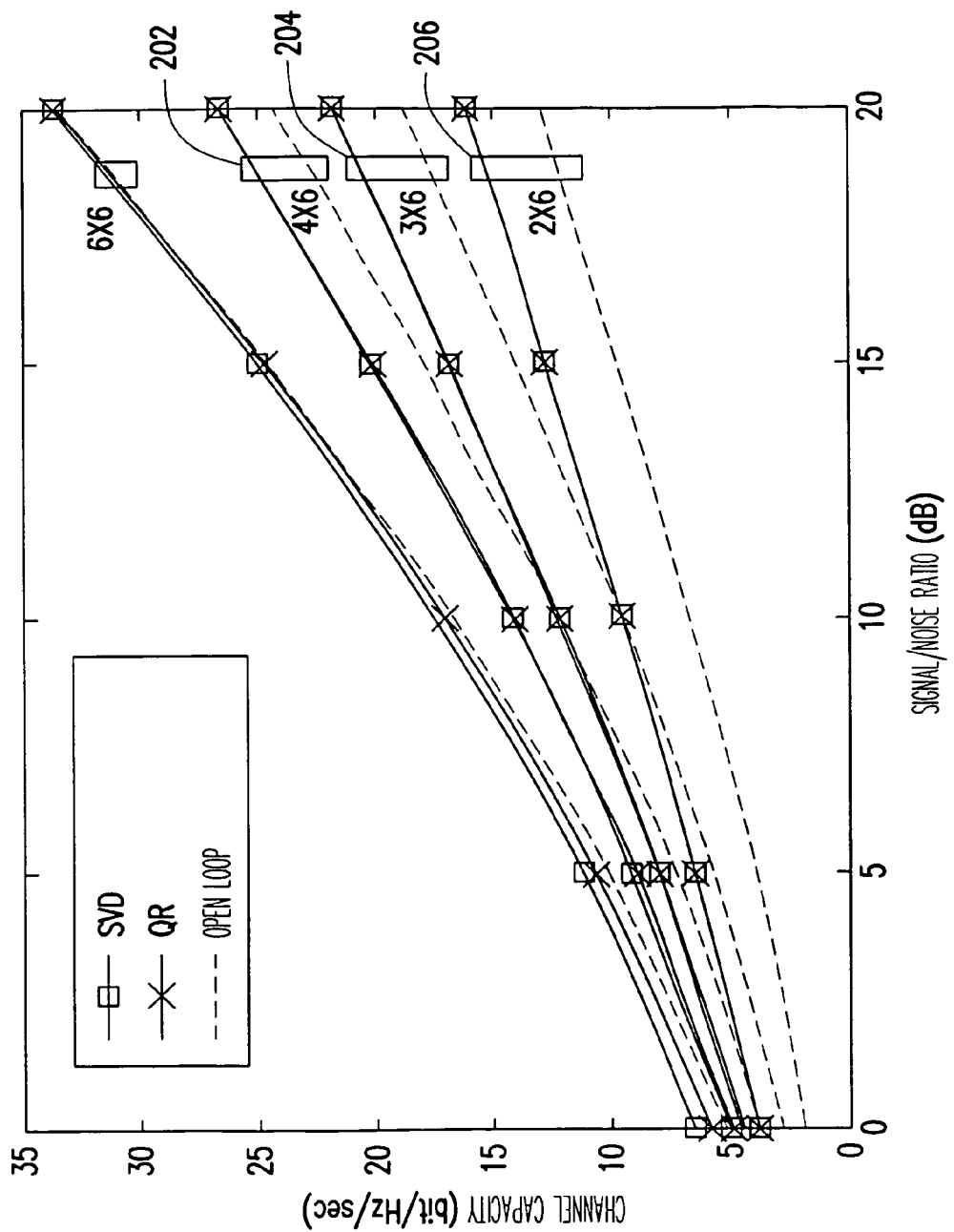
FIG. 2 is a chart showing different efficiency between the embodiment of the present invention using the QR decomposition method and the prior art using the open loop method or the singular value decomposition (SVD) method.

FIG. 2 is a chart showing the different efficiency between the embodiment of the present invention using the QR decomposition method and the prior art using the open loop method or the singular value decomposition (SVD) method. Referring to FIG. 2, the numbers 202, 204 and 206 represent the efficiency corresponding to three conditions of $M_R=4$ and $M_T=6$, $M_R=3$ and $M_T=6$ and $M_R=2$ and $M_T=6$, respectively. After comparing the three efficiencies, it can be seen that the QR decomposition scheme used by the present invention is much better than the open loop scheme used by the prior art, and the QR decomposition scheme has the almost same efficiency as the SVD scheme in addition to the advantage that the complexity is reduced and the computation is lowered. For example, if the dimension of the channel matrix H is 2×4, then only a multiplication computation of 10 complex numbers for each frequency band is required. It can be seen further from FIG. 2 that the architecture provided by the present invention is very suitable for a system with a receiving antenna number smaller than the transmitting antenna number, that is a system with $M_R<M_T$. In particular, when $M_R<<M_T$, the effect of the present invention can be best proven.

Figure 3A:
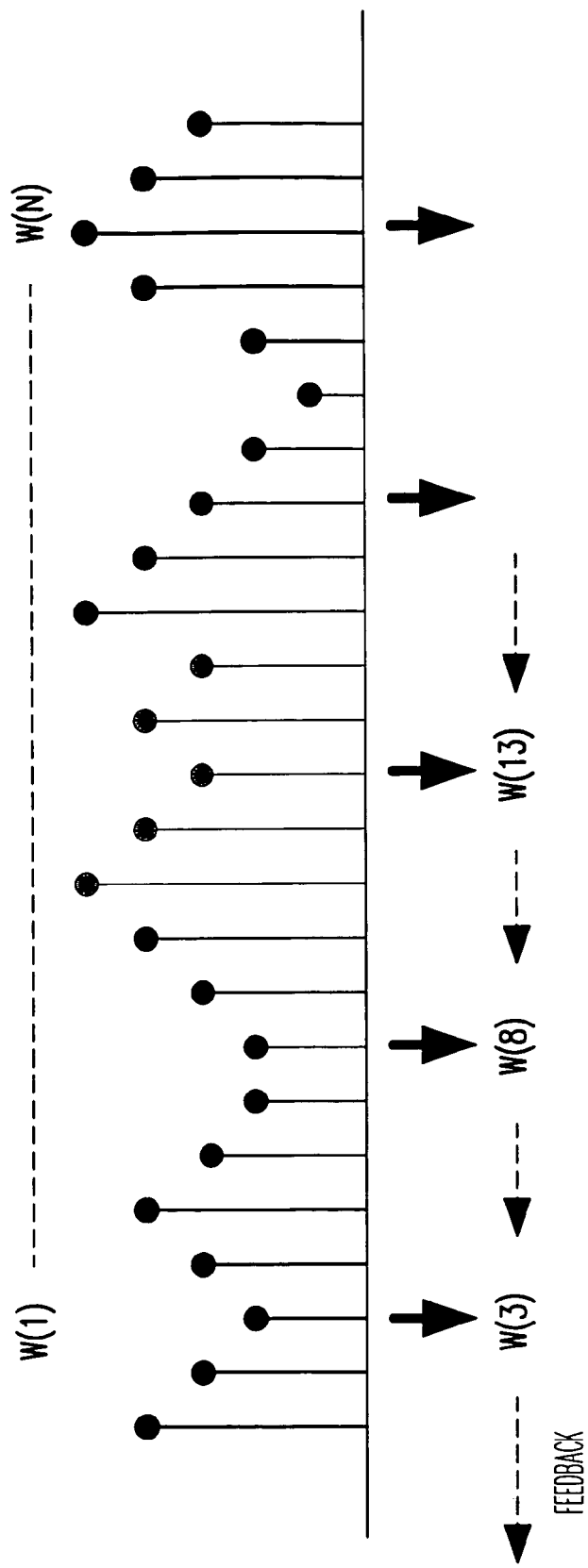
FIG. 3A is a feedback information scheme diagram where the channel estimator & feedback parameter generator of the MIMO-OFDM system in FIG. 1 only feeds back the parameters and data of partial frequency bands.

FIG. 3A is a feedback information scheme diagram where the channel estimator & feedback parameter generator of the MIMO-OFDM system in FIG. 1 only feeds back the parameters and data of partial frequency bands. Referring to FIG. 3A, the channel estimator & feedback parameter generator at the receiver is not required to really feed back the information of all the frequency bands; instead, only the information of a part of the frequency bands. The vector-coding matrix generator, according to the MIMO channel matrixes of the partial frequency bands, would generate the Givens rotation matrixes $G_{p,q}(\theta,\phi)$ of the partial frequency bands and produces the feedback parameters according to θ and φ of the part of the frequency bands. As shown in FIG. 3A, although there are N frequency bands from 1 to N, only the information of the 3-rd, the 8-th, the 13-th . . . frequency bands is fed back; i.e. only the information related to the spatial vector-coding matrixes W(3), W(8), W(13) etc. is fed back.

Figure 3B:
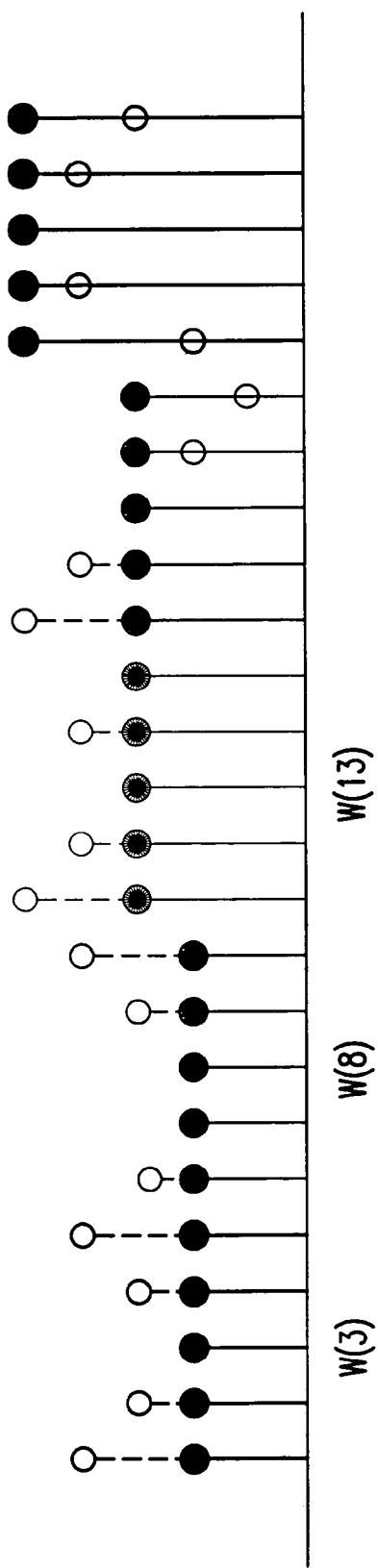
FIG. 3B is a feedback information scheme diagram where the vector-coding matrix generator of the MIMO-OFDM system in FIG. 1 uses the clustering method on the feedback parameters for combining the data of all the frequency bands.
Figure 3C:
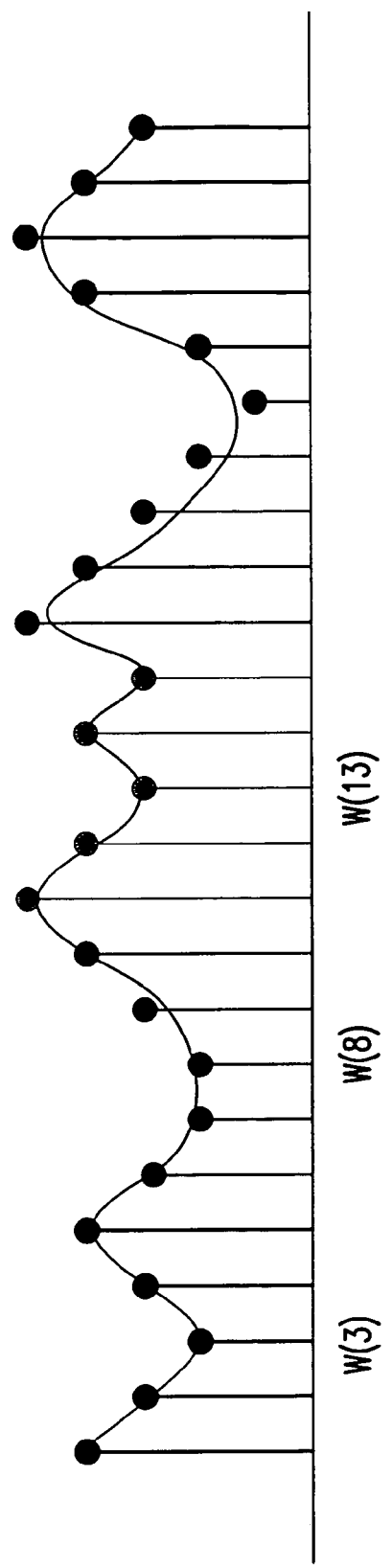
FIG. 3C is a feedback information scheme diagram where the vector-coding matrix generator of the MIMO-OFDM system in FIG. 1 uses the interpolation method on the feedback parameters for combining the data of all the frequency bands.

The vector-coding matrix generator at the transmitter only generates θ(n) and φ(n) of partial frequency bands according to the feedback parameters, then a clustering method or an interpolation method is used to generate θ(n) and φ(n) of all the frequency bands, and further all the spatial vector-coding matrixes are produced. Since θ(n) and φ(n) are the parameter data in the Givens rotation matrixes, the spatial vector-coding matrixes finally obtained by using the interpolation computation still have an orthogonal characteristic. FIG. 3B is a feedback information scheme diagram where the vector-coding matrix generator of the MIMO-OFDM system in FIG. 1 uses the clustering method on the feedback parameters for combining the data of all the frequency bands and FIG. 3C is a feedback information scheme diagram where the vector-coding matrix generator of the MIMO-OFDM system in FIG. 1 uses the interpolation method on the feedback parameters for combining the data of all the frequency bands. Referring to FIGS. 3B and 3C, by using the clustering method, since the frequency bands near the frequency band of each feedback parameter are simply replaced by the spatial vector-coding matrix obtained with the frequency band of the feedback parameter, the result thereof is less than desired in comparison with the interpolation method. Therefore, the interpolation method is a better approach to more truly reproduce the spatial vector-coding matrixes of all the frequency bands.

According to the above-described operations at the receiver and transmitter of the system, the feedback method and the pre-coding method in the MIMO-OFDM system of the present invention can be summarized as follows. In the feedback method, the Givens rotation matrixes $G_{p,q}(\theta,\phi)$ of the partial frequency bands are generated only based on the MIMO channel matrixes of the partial frequency bands and then according to θ and φ of the generated Givens rotation matrixes of the partial frequency bands, the feedback parameters are produced. In the pre-coding method, according to the feedback parameters, θ(n) and φ(n) of the partial frequency bands are generated, and then the interpolation method is used to generate θ(n) and φ(n) of all the frequency bands to further produce the spatial vector-coding matrixes.

Figure 4:
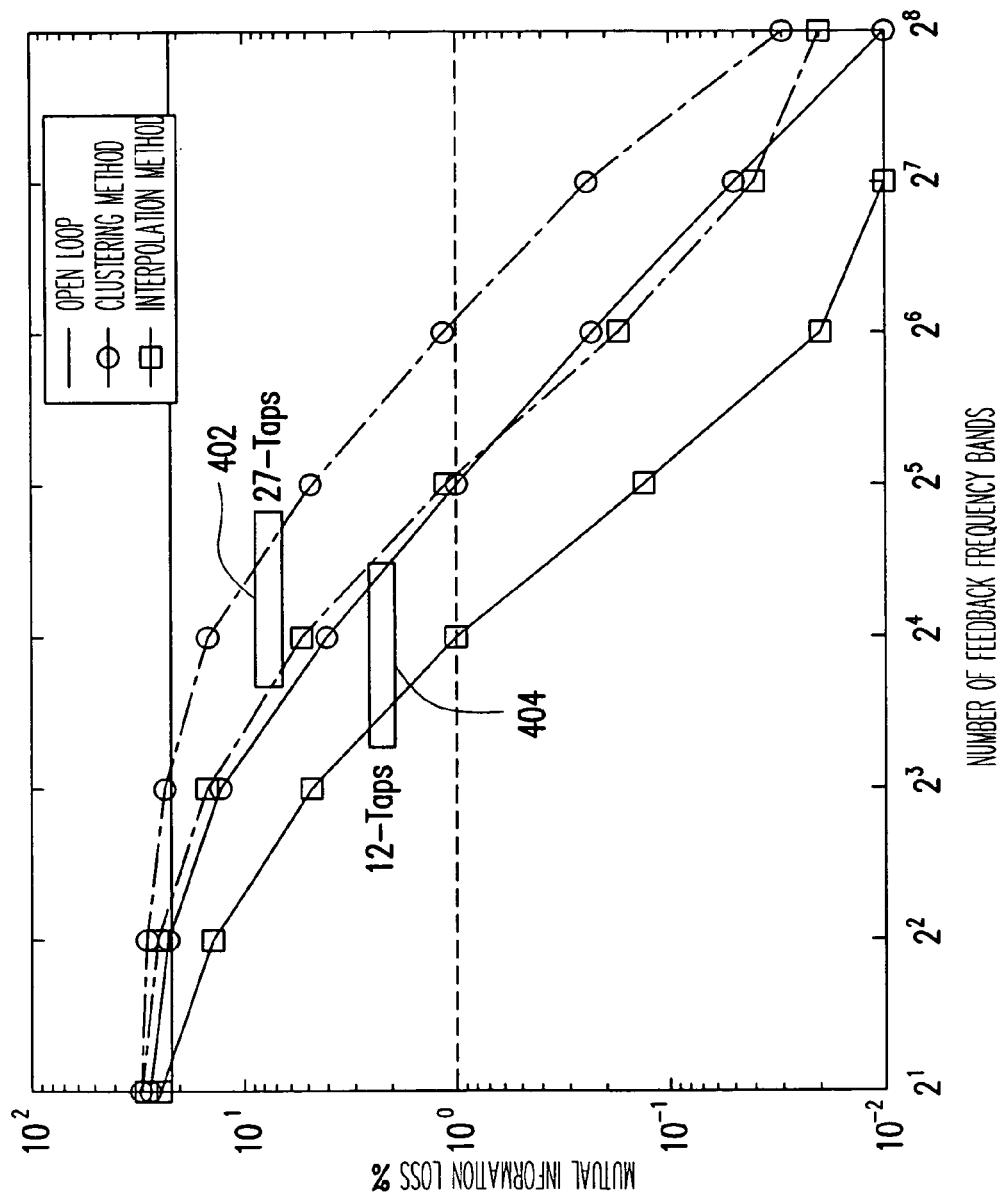
FIG. 4 is a chart showing different efficiency by using the clustering method and using the interpolation method in the embodiment of the present invention.

FIG. 4 is a chart showing different efficiency by using the clustering method and using the interpolation method in the embodiment of the present invention. Referring to FIG. 4, the result in the chart is obtained by simulating a system with a total frequency band number N of 1024. Wherein, the abscissa represents the number of feedback frequency bands and the ordinate represents the mutual information loss. The marks 402 and 404 represent the efficiency with a large variation (hidden line 27-taps) and with a small variation (solid line 12-taps), respectively. The marks 402 and 404 prove the interpolation method is much better than the clustering method in the present invention. For example, if the mutual information loss is $10^0=1\%$ and the system is in a condition of small variation (12-taps), $2^4=16$ frequency bands and $2^5=32$ frequency bands are needed to be fed back for the interpolation method and the clustering method, respectively.

Figure 5:
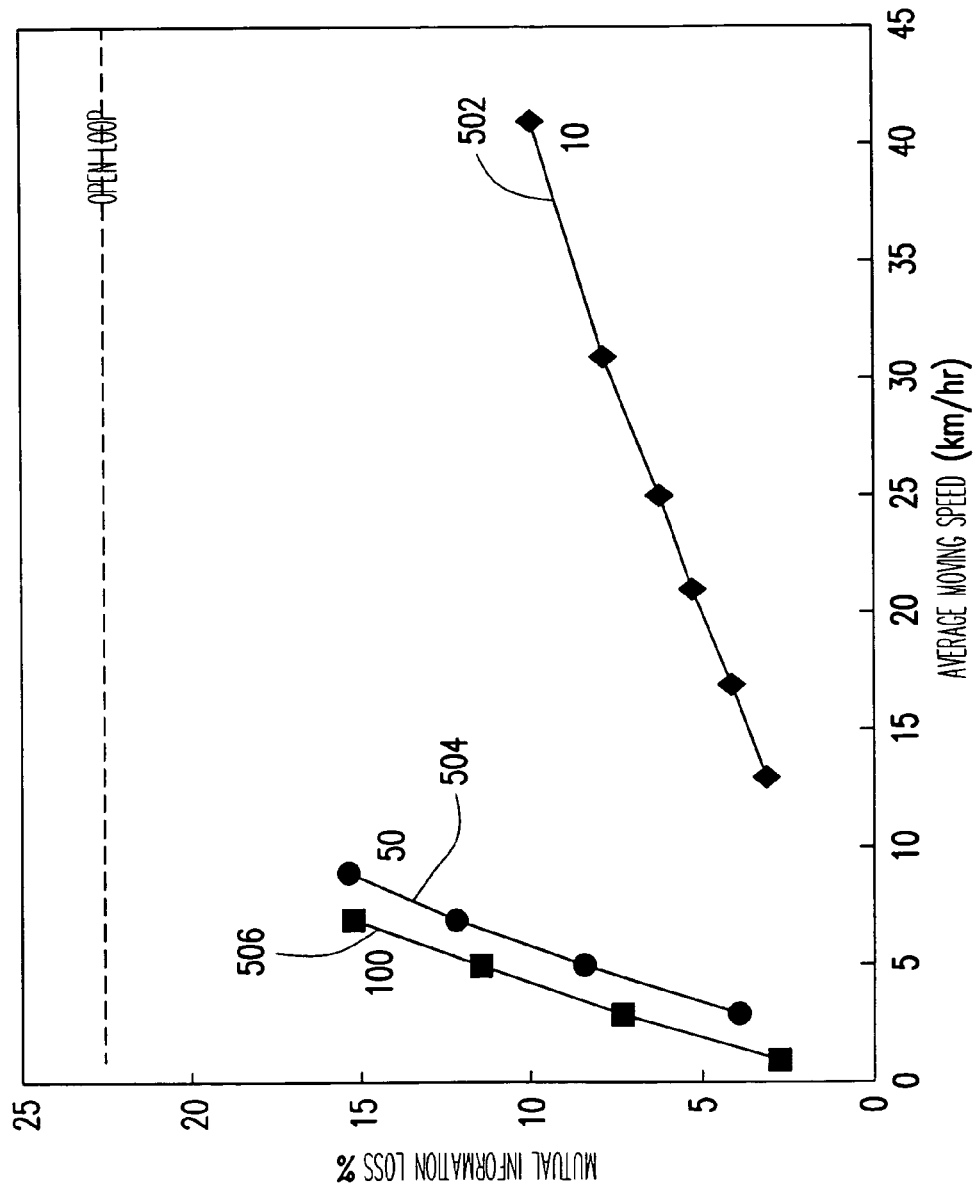
FIG. 5 is a chart showing the different efficiency corresponding to different numbers of feedback frequency bands.

FIG. 5 is a chart showing the different efficiency corresponding to different numbers of feedback frequency bands. Referring to FIG. 5, the abscissa thereof represents the average moving speed and the ordinate represents the mutual information loss. The numbers 502, 504 and 506 represent the efficiency with frequency band numbers of 10, 50 and 100 between two adjacent feedback frequency bands, respectively. According to the lines of 502, 504 and 506, the fewer the frequency band number between two adjacent feedback-frequency bands, the bigger the allowable average moving speed for a same mutual information loss. For example, if the mutual information loss is 5%, for the frequency band number of 10 between two adjacent feedback frequency bands, the allowable average moving speed is 17 kilometer/hour; while for the frequency band number of 100 between two adjacent feedback frequency bands, the allowable average moving speed falls to 2 kilometer/hour only.

According to the results in FIGS. 4 and 5, the present invention only feeds back the information related to θ and φ of the Givens rotation matrixes of the partial frequency bands, and then uses the interpolation method to generate θ and φ of the Givens rotation matrixes of all the frequency bands to further produce the spatial vector-coding matrixes of all the frequency bands. In the above-described examples, for a system typically with a 512 frequency bands, if the dimension of the channel matrix is 2×4 and at least 10 real numbers are required to be fed back, then the total feedback information reaches as high as 5,120 real numbers. If only the information of one frequency band is required to be fed back for 10 frequency bands, the feedback information falls to 512 real numbers, i.e. 1/10 of the previous real numbers.

In summary, since the present invention uses the QR decomposition of the MIMO channel matrixes, instead of using the complicate singular value decomposition (SVD), to parameterize the channel state information (CSI), the complexity is reduced and the computation is lowered. In addition, in the present invention, only θ and φ in the Givens rotation matrixes of a part of frequency bands are fed back and an interpolation method is used to generate θ and φ in the Givens rotation matrixes of all the frequency bands and to further produce the spatial vector-coding matrixes of all the frequency bands, therefore the feedback data amount can be freely controlled and the feedback rate requirement can be well responded to.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An antenna-array-based multiple-input multiple-output orthogonal-frequency-division-multiplexing (MIMO-OFDM) system, comprising:

$M_R$ receiving antennas;

$M_R$ frequency band demodulators, coupled to the receiving antennas for demodulating the signals received by the receiving antennas, wherein each frequency band demodulator obtains tones of N different frequency bands;

a channel estimator & feedback parameter generator, coupled to the frequency band demodulators and used for estimating an obtained channel state information (CSI) of N different frequency bands according to the outputs from the frequency band demodulators and producing a feedback parameter according to the CSI;

N detectors, coupled to the frequency band demodulators and the channel estimator & feedback parameter generator and used for conducting decoding on the outputs from the frequency band demodulators according to the CSI and obtaining N receiving data vectors, wherein a single detector receives the tones with a same frequency band output from all the frequency band demodulators;

a vector-coding matrix generator, used for producing N spatial vector-coding matrixes W(n) according to the feedback parameter, wherein when H(n) is a MIMO channel matrix of the n-th frequency band, a QR decomposition of H(n) is expressed by:

$$H(n)=R(n)Q^*(n),$$

wherein R(n) is a lower triangular matrix with a dimension of $M_R \times M_T$, Q(n) is an orthonormal matrix with a dimension of $M_T \times M_T$ and Q*(n) represents the complex conjugate transpose matrix of Q(n), and when Q(n)=[$q_1(n)\ q_2(n)\ldots q_{M_T}(n)$], $q_m(n)$ represents the m-th column vector in the matrix Q(n), thus:

$$W(n)=[q_1(n)\ q_2(n)\ldots q_M(n)];$$

N coders, coupled to the vector-coding matrix generator and used for receiving N transmission data vectors, wherein each transmission data vector has a dimension of M×1, and according to the vector-coding matrixes, the coders conduct coding on the transmission data vectors and each coder outputs $M_T$ tones with a same frequency band but different from the other coders;

$M_T$ transmitting antennas; and $M_T$ frequency band modulators, coupled to the coders and the transmitting antennas and used for conducting modulations on the outputs from the coders, then outputting the modulated signals at the transmitting antennas, wherein each frequency band modulator receives the tones of different frequency bands output from all the coders, wherein $M_R$, $M_T$, M, N, m and n are natural numbers and $0 < M \leq M_T$, $0 < n \leq N$.

2. The antenna-array-based MIMO-OFDM system as recited in claim 1, wherein the channel estimator & feedback parameter generator, according to the CSI, uses Givens rotations on the MIMO channel matrixes H(n) to generate a plurality of Givens rotation matrixes $G_{p,q}(\theta,\phi)$ and according to the θ and φ of the Givens rotation matrixes produces the feedback parameter.

3. The antenna-array-based MIMO-OFDM system as recited in claim 2, wherein the channel estimator & feedback parameter generator according to the Givens rotation matrixes $G_{p,q}(\theta,\phi)$ uses a delta modulation on θ and φ to produce the feedback parameters.

4. The antenna-array-based MIMO-OFDM system as recited in claim 3, wherein the channel estimator & feedback parameter generator uses a delta modulation with a one-bit quantizer or a multi-bit quantizer on θ and φ to produce the feedback parameter.

5. The antenna-array-based MIMO-OFDM system as recited in claim 2, wherein the channel estimator & feedback parameter generator according to the MIMO channel matrixes of a part of frequency bands, only generates the Givens rotation matrixes $G_{p,q}(\theta,\phi)$ of the part of frequency bands and according to θ and φ of the Givens rotation matrixes of the part of frequency bands, further produces the feedback parameter.

6. The antenna-array-based MIMO-OFDM system as recited in claim 5, wherein the vector-coding matrix generator according to the feedback parameter, generates θ(n) and φ(n) of the part of the frequency bands and uses an interpolation method to generate θ(n) and φ(n) of all the frequency bands, to further produce the spatial vector-coding matrixes.

7. The antenna-array-based MIMO-OFDM system as recited in claim 1, wherein $M_R < M_T$.

8. A feedback method used in the antenna-array-based multiple-input multiple-output orthogonal-frequency-division-multiplexing (MIMO-OFDM) system, wherein the system comprises $M_R$ receiving antennas and $M_T$ transmitting antennas; the feedback method comprising:

demodulating the signals received by the $M_R$ receiving antennas, wherein the signals received by each $M_R$ receiving antenna can be demodulated to obtain tones of N different frequency bands;

according to the tones of all the different frequency bands, estimating the obtained channel state information (CSI) of the N different frequency bands;

dividing all the tones into N sets, wherein each set sequentially comprises $M_R$ tones w with a same frequency band but obtained by different receiving antennas, and according to the CSI the tones of each set are detected and decoded to obtain N receiving data vectors; and according to the CSI, producing and feeding back feedback parameter, wherein when H(n) is the MIMO channel matrix of the n-th frequency band, a QR decomposition of H(n) is expressed by:

$$H(n)=R(n)\,Q^*(n),$$

wherein R(n) represents a lower triangular matrix with a dimension of $M_R \times M_T$, Q(n) represents an orthonormal matrix with a dimension of $M_T \times M_T$ and $Q^*(n)$ represents the complex conjugate transpose matrix of Q(n); when $Q(n)=[q_1(n)\ q_2(n)\ldots q_{MT}(n)]$, $q_m(n)$ represents the m-th column vector in the matrix Q(n), and let the spatial vector-coding matrix $W(n)=[q_1(n)\ q_2(n)\ldots q_M(n)]$, thus, a process that the tone of every same frequency band is detected and decoded to obtain all the receiving data vectors corresponds to the coding by using the spatial vector-coding matrixes W(n), wherein $M_R$, $M_T$, M, N, m and n are natural numbers and $0<M \leq M_T$, $0<n \leq N$.

9. The feedback method used in the antenna-array-based MIMO-OFDM system as recited in claim 8, wherein the Givens rotations are used on the MIMO channel matrixes H(n) to generate a plurality of Givens rotation matrixes $G_{p,q}(\theta,\phi)$, and according to $\theta$ and $\phi$ of the Givens rotation matrixes the feedback parameter is produced.

10. The feedback method used in the antenna-array-based MIMO-OFDM system as recited in claim 9, wherein a delta modulation is conducted on $\theta$ and $\phi$ in the Givens rotation matrixes $G_{p,q}(\theta,\phi)$ to produce the feedback parameter.

11. The feedback method used in the antenna-array-based MIMO-OFDM system as recited in claim 10, wherein a delta modulation with a one-bit quantizer or a multi-bit quantizer is conducted on $\theta$ and $\phi$ to produce the feedback parameter.

12. The feedback method used in the antenna-array-based MIMO-OFDM system as recited in claim 9, wherein only according to the MIMO channel matrixes of a part of frequency bands, the Givens rotation matrixes $G_{p,q}(\theta,\phi)$ of the part of frequency bands are generated, and according to $\theta$ and $\phi$ in the Givens rotation matrixes of the part of frequency bands, the feedback parameter is further produced.

13. A pre-coding method used in the antenna-array-based multiple-input multiple-output orthogonal-frequency-division-multiplexing (MIMO-OFDM) system, wherein the system comprises $M_R$ receiving antennas and $M_T$ transmitting antennas; the pre-coding method comprising:

receiving a feedback parameter;

according to the feedback parameter, producing N spatial vector-coding matrixes, wherein let H(n) be the MIMO channel matrix of the n-th frequency band and a QR decomposition of H(n) is expressed by:

$$H(n)=R(n)\,Q^*(n),$$

wherein R(n) represents a lower triangular matrix with a dimension of $M_R \times M_T$, Q(n) represents an orthonormal matrix with a dimension of $M_T \times M_T$ and $Q^*(n)$ represents the complex conjugate transpose matrix of Q(n); let $Q(n)=[q_1(n)\ q_2(n)\ldots q_{MT}(n)]$, wherein $q_m(n)$ represents the m-th column vector in the matrix Q(n), thus:

$$W(n)=[q_1(n)\ q_2(n)\ldots q_M(n)];$$

receiving N transmission data vectors, wherein each transmission data vector has a dimension of M×1, according to the vector-coding matrixes, the transmission data vectors are coded and after coding each transmission data vector, $M_T$ tones with a same frequency band are obtained, wherein the tones obtained from different transmission data vector have different frequency bands from each other; and dividing all the tones into $M_T$ sets, wherein each set comprises N tones with different frequency bands obtained from the different transmission data vectors, and after conducting modulations on the tones of every set, the modulated signals are output by the transmitting antennas, wherein, $M_R$, $M_T$, M, N, m and n are natural numbers and $0<M \leq M_T$, $0<n \leq N$.

14. The pre-coding method used in the antenna-array-based MIMO-OFDM system as recited in claim 13, wherein according to the feedback parameter, a plurality of Givens rotation matrixes $G_{p,q}(\theta,\phi)$ are generated and according to the Givens rotation matrixes $G_{p,q}(\theta,\phi)$, N spatial vector-coding matrixes W(n) are further produced.

15. The pre-coding method used in the antenna-array-based MIMO-OFDM system as recited in claim 14, wherein a delta modulation is conducted on $\theta$ and $\phi$ in the Givens rotation matrixes $G_{p,q}(\theta,\phi)$ to produce feedback parameter.

16. The pre-coding method used in the antenna-array-based MIMO-OFDM system as recited in claim 15, wherein a delta modulation with a one-bit quantizer or a multi-bit quantizer is conducted on $\theta$ and $\phi$ to produce feedback parameter.

17. The pre-coding method used in the antenna-array-based MIMO-OFDM system as recited in claim 14, wherein according to the feedback parameter, $\theta(n)$ and $\phi(n)$ of only partial frequency bands are generated and then an interpolation method is used to generate $\theta(n)$ and $\phi(n)$ of all the frequency bands and to further produce the spatial vector-coding matrixes.

* * * * *